(12) United States Patent
Boudebiza et al.

(10) Patent No.: US 11,772,778 B2
(45) Date of Patent: Oct. 3, 2023

(54) SYSTEM FOR CONTROLLING THE CYCLIC SETTING OF BLADES

(71) Applicant: SAFRAN AIRCRAFT ENGINES, Paris (FR)

(72) Inventors: Tewfik Boudebiza, Moissy-Cramayel (FR); Julien Michel Patrick Christian Austruy, Moissy-Cramayel (FR); Gilles Alain Marie Charier, Moissy-Cramayel (FR); Cedrik Djelassi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/766,047

(22) PCT Filed: Oct. 2, 2020

(86) PCT No.: PCT/FR2020/051730
§ 371 (c)(1),
(2) Date: Apr. 1, 2022

(87) PCT Pub. No.: WO2021/064333
PCT Pub. Date: Apr. 8, 2021

(65) Prior Publication Data
US 2022/0371721 A1     Nov. 24, 2022

(30) Foreign Application Priority Data
Oct. 2, 2019     (FR) ........................ 1910908

(51) Int. Cl.
*B64C 11/40* (2006.01)
*B64C 11/30* (2006.01)
*F01D 7/00* (2006.01)

(52) U.S. Cl.
CPC .............. *B64C 11/40* (2013.01); *B64C 11/30* (2013.01); *F01D 7/00* (2013.01); *F05D 2220/30* (2013.01);
(Continued)

(58) Field of Classification Search
CPC ....... B64C 11/40; B64C 11/30; B64C 11/308; B64C 11/303; F01D 7/00; F05D 2220/30;
(Continued)

(56) References Cited

U.S. PATENT DOCUMENTS

| 4,252,498 A | 2/1981 | Radcliffe et al. |
| 2010/0104438 A1 * | 4/2010 | Charier .................. F02K 3/025 416/155 |

(Continued)

FOREIGN PATENT DOCUMENTS

| FR | 2 996 591 A1 | 4/2014 |
| FR | 2 997 138 A1 | 4/2014 |
| FR | 3 067 415 A1 | 12/2018 |

OTHER PUBLICATIONS

French Search Report dated Mar. 27, 2020 in French Application No. 1910908.
(Continued)

*Primary Examiner* — Aaron R Eastman
(74) *Attorney, Agent, or Firm* — Sughrue Mion, PLLC

(57) ABSTRACT

The invention describes a system for controlling the cyclic setting of blades (1) of a turbine engine propeller, the blades (1) being arranged in a plane normal to the axis of rotation (r) of the propeller, the system comprising: —a plate assembly (40) that can be tilted relative to the normal plane (P), —an articulation system (50) articulating the plate assembly (40) relative to the blades (1) such that tilting the plate assembly (40) modifies the setting of the blades (1), —a force sensor (5) designed to measure a force applied in the
(Continued)

normal plane (P) by an air flow at the inlet of the propeller blades (1), —a cylinder (60) suitable for tilting the plate assembly (40) in response to a force measured by the force sensor (5).

9 Claims, 9 Drawing Sheets

(52) U.S. Cl.
CPC .... *F05D 2240/30* (2013.01); *F05D 2260/941* (2013.01)

(58) Field of Classification Search
CPC ........... F05D 2240/30; F05D 2260/941; F04D 29/323
See application file for complete search history.

(56) References Cited

U.S. PATENT DOCUMENTS

| | | | |
|---|---|---|---|
| 2012/0070290 A1* | 3/2012 | Balk | B64C 11/32 416/147 |
| 2012/0070292 A1* | 3/2012 | Balk | F02K 3/02 416/168 A |
| 2013/0195687 A1* | 8/2013 | Achten | F04B 1/328 417/222.1 |
| 2014/0099202 A1* | 4/2014 | Jodet | F02C 6/206 416/31 |
| 2014/0294585 A1* | 10/2014 | Escure | B64C 11/30 416/147 |
| 2015/0285262 A1* | 10/2015 | Fabre | F04D 29/668 416/1 |
| 2018/0335047 A1* | 11/2018 | Charier | B64C 11/06 |
| 2020/0131917 A1* | 4/2020 | Lemarchand | F04D 25/028 |
| 2021/0262414 A1* | 8/2021 | Wollenberg | F02K 3/04 |
| 2021/0381388 A1* | 12/2021 | Tajan | F01D 25/16 |

OTHER PUBLICATIONS

International Search Report dated Nov. 18, 2020 in International Application No. PCT/FR2020/051730.
Written Opinion of the International Searching Authority dated Nov. 18, 2020 in International Application No. PCT/FR2020/051730.

\* cited by examiner

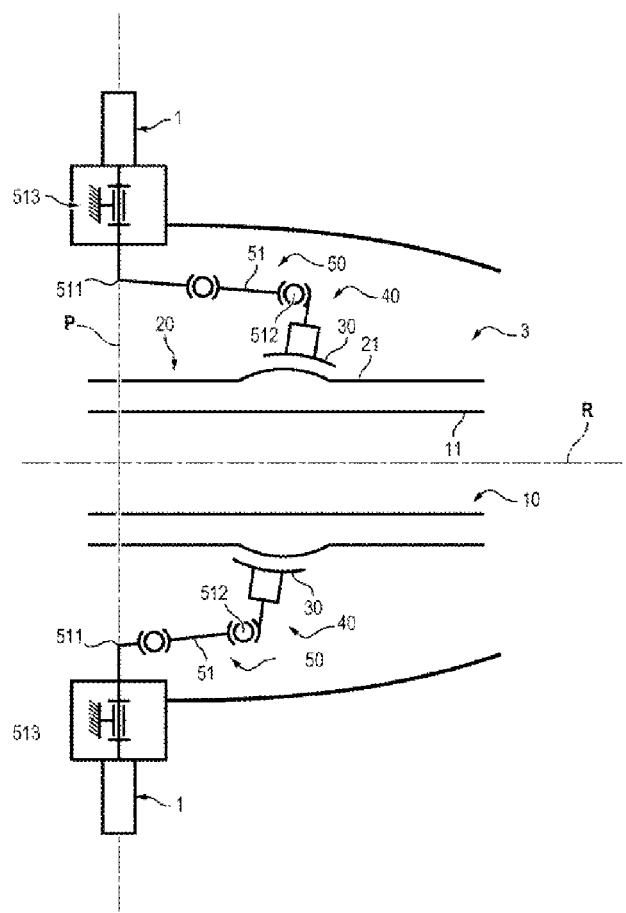

SYSTEM FOR CONTROLLING THE CYCLIC SETTING OF BLADES

CROSS REFERENCE TO RELATED APPLICATIONS

This application is a National Stage of International Application No. PCT/FR2020/051730 filed Oct. 2, 2020, claiming priority based on French Patent Application No. 1910908 filed Oct. 2, 2019, the entire contents of each of which being herein incorporated by reference in their entireties.

TECHNICAL FIELD

The present application relates to the field of systems for controlling the cyclic pitch of blades for a turbomachine propeller.

BACKGROUND

The air flow at the inlet of the blades of a turbomachine propeller of an aircraft can have an angle of attack relative to the axis of rotation of the blades, which corresponds to the longitudinal axis of the turbomachine. The blades of the propeller or of the fans of the turbomachines are then subjected to a distribution of air flow which is not homogeneous during their rotation around the longitudinal axis.

This angle of attack can be the result of predictable phases, such as incidence phases or maneuvering phases, during climbs, descents or turns which can cause sideslip of the aircraft. This angle of attack can also be the result of non-predictable phases, such as crosswind phases. FIG. 1a illustrates for example an airplane in the cruise phase at a stabilized altitude, the air flow F at the inlet of the blades 1 of the propeller being directed in the longitudinal direction corresponding to the axis of rotation r of the propeller. FIG. 1b shows an airplane in the climb phase, the air flow F comprising a longitudinal component directed along the axis of rotation of the propeller and a transverse component in a plane perpendicular to the axis of rotation r of the propeller.

This angle of attack, corresponding to a non-homogeneous distribution of air flow on the blades, causes an asymmetry in the lift and the drag of the blades, which causes asymmetrical thrust of the blades. The thrust then comprises a longitudinal component, but also a transverse component corresponding to lateral and vertical parasite forces, i.e. directed in a normal plane perpendicular to the longitudinal axis.

In addition to the loss of thrust produced, these parasite forces cause parasite moments, called "1P moments" in the aeronautical field, applied to the blades.

The 1P moment is dimensioning for the mass of the structure of the blades of the turbomachine and for the set of parts providing the attachment of the propeller to the aircraft. In fact, the mass of these parts is dimensioned so as to ensure their resistance to the 1P moment: an increase in the 1P moment therefore causes an increase in the mass of these parts. Moreover, a large 1P moment is likely to increase wear and thus reduce the lifetime of the propeller and of the parts providing the attachment of the engine to the aircraft, which requires carrying out additional maintenance and part replacement operations.

The 1P moment due to a non-homogeneous air flow has an impact for shrouded architectures such as turbofans, despite a certain straightening of the flow by the nacelle. This phenomenon is present in particular for turbofans with a high bypass ratio, which therefore have a very large fan propeller diameter. A shrouded turbofan is for example illustrated in FIG. 2a.

The 1P moment is particularly dimensioning for unshrouded architectures, for example turboprops, or the open rotors which allow an increase in the bypass ratio relative to conventional turbofans. An open rotor is illustrated by way of an example in FIG. 2b. For these unshrouded architectures, the 1P moment is very dimensioning for the structure of the propeller as well as for the optimization of its operation.

The 1P moment is also dimensioning for buried engines, an asymmetry being likely to appear between the covered portion and the free portion of the propeller.

The pitch of the blades of the propeller can be controlled so as to reduce the 1P moment by redirecting the thrust in the longitudinal direction. The pitch of a blade corresponds to the angle formed between, on the one hand, an axis connecting the leading edge to the trailing edge of the blade, and on the other hand the axis of rotation of the propeller.

Systems for controlling the collective pitch of the blade are known, capable of identically modifying the pitch of the set of blades. The blades then all have the same pitch. In particular, a cylinder can cause the longitudinal displacement of a disk articulated relative to the blades via connecting rods, the longitudinal displacement of the disk causing a collective modification of the pitch of the blades. However, these systems do not allow reducing the 1P moment resulting from a non-homogeneous distribution of the air flow on the blades. These systems are therefore suitable for flight phases at a stabilized altitude with no crosswind, but not to maneuvering, approach or crosswind phases.

Systems for controlling the cyclic pitch of blades are also known from the prior art. These systems are able to impose on each blade a pitch which varies cyclically depending on its angular position around the axis of rotation, each blade having its own particular pitch. The pitch is suitable for counteracting the 1P moment to produce a longitudinal thrust by optimizing the pitch of the blade to the incident flow.

Such systems exist in particular in the field of helicopters. However, these systems are not suitable for the constraints, for the needs and for the architectures encountered in other aircraft such as airplanes.

A system for controlling the cyclic pitch of a propeller is described in document FR 2 996 591. The blades are fixed to two disks mounted in rotation with the hub of the propeller. Four cylinders allow inclining one of the disks relative to the other, which causes a cyclic pitch of the blades. However, the blades are directly fixed to the two disks at the attachment points, and the two disks are integral in rotation with the propeller, which strongly constrains the positioning of the device. Moreover, the control system described does not allow active control of the cyclic pitch of the blades depending on the forces encounters by the airplane during flight.

A system for passive adaptation of the cyclic pitch of the blades of an unshrouded propeller is described in French patent application no. 17552851. In this system, connecting rods are fixed, on the one hand, to the blades and on the other hand to an inclinable disk. A non-longitudinal air flow creates on the blades a force tending to modify their pitch, the connecting rods applying, in their turn, a force on the disk which tends to modify the inclination of the disk until a position where the forces in the normal plane cancel one another. However, this system does not allow active control of the cyclic pitch of the blades and also does not allow adapting the sensitivity of the modification of the pitch of the blades depending on the forces in the normal plane.

Finally, a system for controlling the cyclic pitch of an unshrouded propeller is described in document FR 2 997 138. At least three cylinders modify the inclination of a part which is articulated relative to the blades, so that the displacement of the cylinders generates a cyclic modification of the pitch of the blades. The pitch of the blades is determined by prior simulations so as to reduce the losses caused by obstacles, such as a wing or a fuselage, these obstacles being known in advance. However, this system requires prior knowledge and simulation of flow inhomogeneities, and does not allow adaptation in real time of the pitch of the blades depending on the phases encountered by the airplane during the flight and of the evolution of inhomogeneities of flow.

GENERAL DISCLOSURE

One aim of the application is to propose a system for controlling the cyclic pitch of blades that allows reducing the parasite forces and moments generated on the blades due to a non-homogeneous distribution of the air flow on the blades.

Another aim of the application is to propose a system for controlling the cyclic pitch of blades suitable to be implemented on a shrouded propeller or on an unshrouded propeller of a turbomachine.

Another aim of the application is to propose a system for controlling the cyclic pitch of blades which allows adjusting the pitch in real time during the flight.

According to a first aspect, the application relates to a system for controlling the cyclic pitch of the blades of a propeller of a turbomachine, the propeller comprising a set of blades movable in rotation around an axis of rotation relative to a stator frame of reference of the turbomachine, the blades being arranged in a plane normal to the axis of rotation of the propeller, called the normal plane, the system being characterized in that it comprises:
- a plate assembly that can be inclined relative to the normal plane,
- an articulation system articulating the plate assembly relative to the blades so that an inclination of the plate assembly causes a cyclic modification of the pitch of the blades, and in that it comprises:
- a force sensor mounted fixed in the stator frame of reference, the force sensor being suitable for measuring a force exerted in the normal plane by an air flow at the inlet of the propeller blades,
- a cylinder suitable for inclining the plate assembly, the cylinder being suitable for being actuated in response to a force measured by the force sensor.

Certain preferred but not limiting features of the system for controlling cyclic pitch described above are the following, taken individually or in combination:
- the force sensor comprises a strain gauge and is suitable for being positioned at a bearing support of an intermediate casing of the turbomachine;
- the system comprises a first set of force sensors suitable for measuring a force in a first direction of the normal plane and a second set of force sensors suitable for measuring a force in a second direction of the normal plane, the second direction being perpendicular to the first direction, the system further comprising a first cylinder suitable for being actuated in response to a force measured by the first set of force sensors, and a second cylinder suitable for being actuated in response to a force measured by the second set of force sensors;
- the plate assembly comprises an inner plate mounted fixed in the stator frame of reference and an outer plate mounted movable in rotation around the axis of rotation of the propeller, the inner plate and the outer plate being separated from one another by means of an antifriction bearing so that the inner plate and the outer plate are independent in rotation around the axis of rotation and are integral in inclination relative to the normal plane, in which the cylinder is actuated so as to modify the inclination of the inner plate, and the articulation system articulates the outer plate relative to the blades;
- the system further comprises a ball comprising a domed outer surface, the plate assembly comprises an inner surface with a shape complementary to the outer surface of the ball and positioned in contact with the outer surface of the ball, so that the outer surface of the ball guides a displacement in inclination of the plate assembly;
- the articulation system includes a set of connecting rods, each connecting rod being articulated at a first end on an associated blade by means of a pivoting link, and at a second end on the plate assembly, the connecting rods being mounted movable in rotation around the axis of rotation of the propeller, so that an inclination of the plate assembly causes a corresponding displacement of the connecting rods capable of cyclically modifying the pitch of the blades;
- the system further comprises a control unit suitable for generating a blade pitch control signal based on a comparison between a measurement signal originating in the force sensor and a predetermined set point signal, the control signal being suitable for actuating the cylinder when the measurement signal differs from the set point signal Scons by a predetermined difference for a predetermined period;
- the system further comprises a system for controlling the collective pitch of blades configured to displace the plate assembly in translation in the longitudinal direction while retaining a same inclination of the plate assembly, so as to modify the pitch of each of the blades identically, the collective pitch of the blades being independent of a cyclic pitch of the blades;

According to a second aspect, the application relates to a turbomachine comprising a system for controlling the cyclic pitch of the blades of a propeller according to the first aspect.

According to a third aspect, the application relates to an aircraft comprising a system for controlling the cyclic pitch of the blades of a turbomachine propeller according to the first aspect.

DESCRIPTION OF THE FIGURES

Other features, aims and advantages of the present application will appear upon reading the detailed description that follows, given by way of a non-limiting example, which will be illustrated by the following figures:

FIGS. 5a and 5b show schematic views, respectively from the side and from the front, of a system for controlling the cyclic pitch of blades conforming to one embodiment, the plat assembly being inclined.

DETAILED DESCRIPTION

Preliminary Notions

Figure 1A:
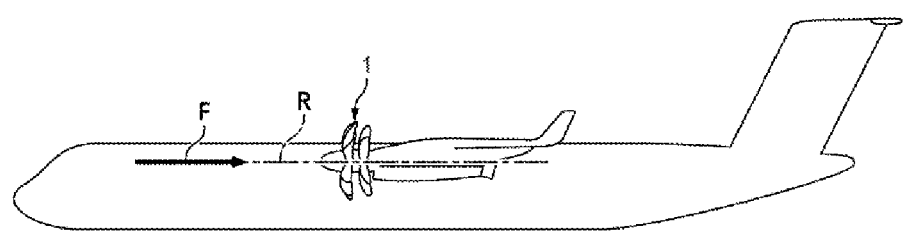
FIG. 1a, already commented on, shows a schematic view of an aircraft during a stabilized flight phase, the air flow at the inlet of the blades of the propeller having a longitudinal component.
Figure 1B:
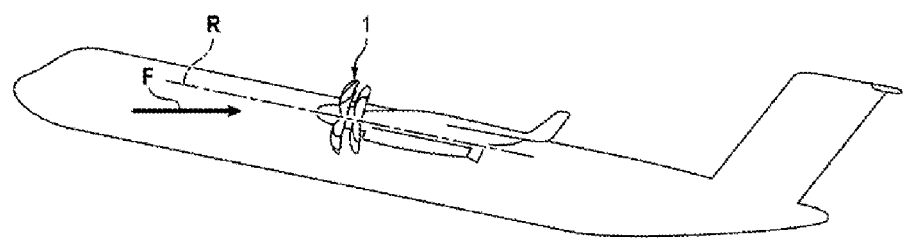
FIG. 1b, already commented on, shows a schematic view of an aircraft during a climb phase, the air flow at the inlet of the blades of the propeller having a longitudinal component and a transverse component.
Figure 2A:
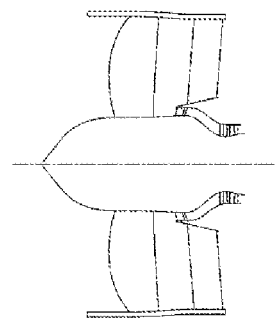
FIGS. 2a and 2b, already commented on, show schematic views of a propeller, respectively of an open rotor and of a shrouded turbofan.
Figure 2B:
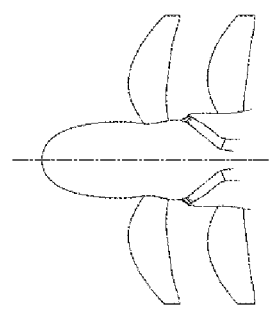

In the present application, the term propeller is used for example to designate a fan propeller of a turbofan, a turboprop propeller, or even an open rotor propeller.

An axis of rotation of the propeller is called the longitudinal axis r. A stator frame of reference is a frame of reference in which the blades 1 of the propeller are in rotation during the operation of the turbomachine. A rotor frame of reference is a frame of reference in which the blades 1 of the propeller are fixed during the operation of the turbomachine.

The terms inner and outer, respectively, are defined so that the inner portion or face of an element is closer to the longitudinal axis r than the outer portion or face of the same element.

General Presentation of the System for Controlling the Cyclic Pitch of Blades 1

A system for controlling the cyclic pitch of the blades 1 of a propeller of a turbomachine, illustrated by way of an example in FIGS. 3 to 7, comprises a set of blades 1 movable in rotation around an axis of rotation r relative to a stator frame of reference of the turbomachine, the blades 1 being arranged in a plane P normal to the axis of rotation r of the propeller, called the normal plane P, the system being characterized in that it comprises:
  a plate assembly 40 that can be inclined relative to the normal plane P,
  an articulation system 50 articulating the plate assembly 40 relative to the blades 1 so that an inclination of the plate assembly 40 causes a cyclic modification of the pitch of the blades 1,
and in that it comprises:
  a force sensor 5 mounted fixed in the stator frame of reference, the force sensor 5 being suitable for measuring a force exerted in the normal plane P by an air flow at the inlet of the blades 1 of the propeller,
  a cylinder 60 suitable for inclining the plate assembly 40, the cylinder 60 being adapted to be actuated in response to a force measured by the force sensor 5.

This system for controlling the cyclic pitch of blades can be applied to turbomachines with shrouded architectures, such as turbofans with a high bypass ratio, or unshrouded, such as open rotors or turboprops.

The force sensor 5 allows measuring a force exerted in the normal plane P by an air flow having an angle of attack relative to the axis of rotation r of the blades 1, the air flow comprising a longitudinal component and a normal component relative to the axis of rotation r.

The force sensor 5 can measure forces continuously during the operation of the propeller. The forces are therefore measured in real time during the flight, independently of any prior knowledge of the blades 1 or of the flight characteristics of the aircraft. Thus, the system allows adaptation in real time of the pitch of the blades 1 depending on the variations of the measurements of forces during the flight, regardless of the type of phase, predictable or not predictable. Moreover, the adaptation of the pitch of the blades is carried out based on a measurement of forces, hence without being based on airplane data such as the trim of the airplane or its attitude. Thus, the system satisfies regulatory standards, its safety is increased and does not depend on airplane data, and the system does not interfere with the pilotability of the airplane.

Figure 5B:
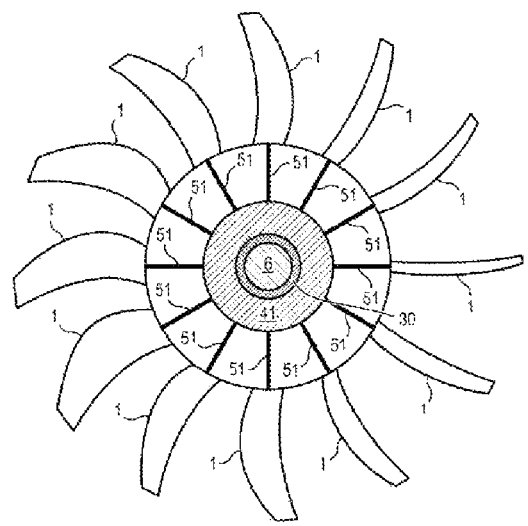
Figure 5C:
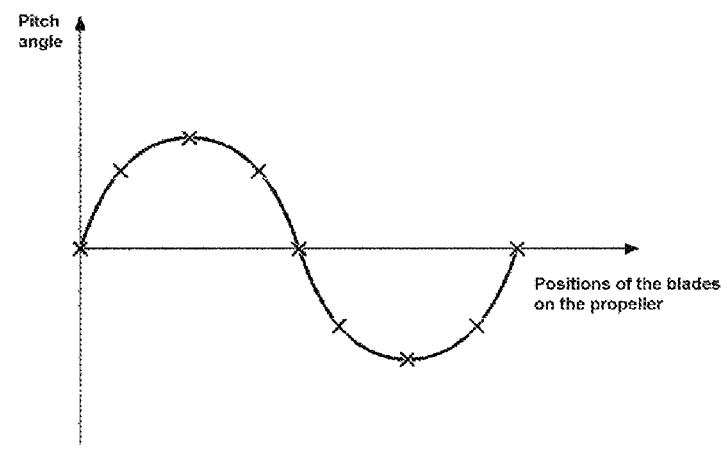
FIG. 5c shows a diagram illustrating a cyclic variation of the pitch of a blade of the assembly illustrated in FIGS. 5a and 5b during a full rotation of the propeller.

The system for controlling the cyclic pitch of blades 1 allows, via the inclination of the plate assembly 40, to impose a specific pitch on each blade 1. The pitch of a blade 1 is modified periodically during the rotation of the blade 1, according to a profile which can be of the sinusoidal type as illustrated by way of an example in FIG. 5c. FIG. 5b illustrates an example of a configuration in which the pitch of the blades is cyclical. The more the plate assembly 40 is inclined, the greater is the amplitude of the variation of pitch of a blade 1 during its rotation. The control system thus allows imposing a cyclic pitch on the blades 1.

The cylinder 60 of the system for controlling the cyclic pitch of the blades 1 is actuated in response to the measured force, which allows adjusting the pitch of the blades 1 by inclining the plate assembly 40 depending on the force exerted in the normal plane P. In particular, the pitch of the blades 1 can be adapted so as to balance the forces exerted by the flow of air on the blades 1 in order to arrive at a longitudinal thrust and at a reduction, or even cancellation, of the parasite forces exerted in the normal plane P.

In particular, an air flow which is not directed only in the longitudinal direction, i.e. an air flow comprising a longitudinal component directed along the axis of rotation r, and a normal component directed in the normal plane P, is likely to generate forces in the normal plane P on the blades 1.

The system for controlling the cyclic pitch of blades allows reducing, or even cancelling, the forces exerted on the blades 1 in the normal plane P due to a non-homogeneous distribution of air flow, i.e. when the air flow has an angle of attack relative to the normal plane P. This allows ensuring symmetrical drag and thrust on the blades 1 of the propeller. Thus, the aerodynamic moment generated on the blades 1 of the propeller by the non-homogeneous air flow (1P moment) can be reduced, or even cancelled, in real time and permanently. In other words, the system allows aligning the thrust of the propeller with the longitudinal axis r of the turbomachine by cancelling the parasite forces and moments in the normal plane P at the axis of rotation of the blades 1 of the propeller.

By reducing, or by cancelling the 1P moment supported by the blades 1 of the turbomachine during the flight, the system for controlling the cyclic pitch of the blades 1 allows a reduction of the mass of the structures bearing the 1P moment, such as the blades 1 or even the parts providing the attachment of the propeller to the aircraft, and therefore also a reduction of the loads induced by this mass. The system also allows a reduction of the wear of the blades 1 and of the parts providing the attachment of the propeller to the aircraft, the number and cost of the associated maintenance operations also being reduced.

Structure of the Turbomachine

The turbomachine can comprise an intermediate casing fixed in the stator frame of reference of the turbomachine, the intermediate casing not being driven in rotation around the axis of rotation r of the propeller with the blades 1.

The intermediate casing of the turbomachine can include a bearing support 20. The bearing support 20 is consequently a part fixed in the stator frame of reference.

In the case of a turbofan with a fan, the intermediate casing can have a portion of the fan casing and a portion of the low-pressure compressor. The system for adapting the pitch of the blades 1 is positioned substantially at the fan casing.

The turbomachine can include a rotor shaft 10 which is linked in rotation with the blades 1 of the propeller. The rotor shaft 10 can be articulated relative to the bearing support 20 via one or more antifriction bearing(s) 15, 16. Thus the rotor shaft 10 is driven in rotation around the longitudinal axis r during the operation of the propeller, while the bearing support 20 is not driven in rotation around the longitudinal axis r during the operation of the propeller, the bearing support 20 being fixed in the stator frame of reference.

The rotor shaft 10 can have an inner portion 11, an outer portion 12 and a connecting portion 13 connecting the inner portion 11 and the outer portion 12. The inner portion 11 and the outer portion 12 of the rotor shaft 10 are substantially cylindrical around the axis of rotation r of the propeller. The outer portion 12 is arranged in a more external position than the inner portion 11, relative to the axis of rotation r.

The outer portion 12 is integral in rotation with the blades 1 of the propeller, and movable in rotation relative to the intermediate casing via one or more antifriction bearing(s) 15. The inner portion 11 is movable in rotation relative to the intermediate casing via one or more antifriction bearing(s) 16. The inner portion 11 of the rotor shaft 10 can be linked in rotation with a shaft of the low-pressure turbine 18 via a reduction gear.

The bearing support 20 can be an annular support arranged between the inner portion 11 and the outer portion 12 of the rotor shaft 10. The bearing support 20 can be centered on the axis of rotation r and be movable in rotation around the axis of rotation r during the operation of the propeller.

The bearing support 20 can have a substantially cylindrical portion 21 arranged around the inner portion 11 of the rotor shaft 10, and a frusto-conical portion 22 linked on the one hand to the substantially cylindrical portion 21 and on the other hand to the intermediate casing, for example at a low-pressure compressor.

Force Sensor 5

The force sensor 5 can be a strain gauge. A strain gauge has good reliability under extreme operating conditions, can be integrated into constrained environments and has a satisfactory lifetime.

As a variant, the force sensor 5 can be, for shrouded architectures, a proximity sensor placed on the shroud and measuring the deformation of the blades 1. As a variant, the force sensor 5 can be a pressure sensor rake measuring the aerodynamic pressure field in proximity to the sensor.

The force sensor 5 is mounted fixed in the stator frame of reference, i.e. the force sensor 5 is not driven in rotation during the operation of the propeller. The installation of the force sensor 5 is thus facilitated, the number and the arrangement of the force sensors 5 is less constrained and the reliability of the measurement is improved relative to a sensor which would for example be installed directly on the blades 1 or other rotating parts.

The force sensor 5 can in particular be mounted on a fixed part in the stator frame of reference and measure a force exerted in the normal plane P on this part. A force of this type is representative of a force exerted in the normal plane P by an air flow at the inlet of the blades 1 of the propeller, when the air flow comprises both a longitudinal component and a component perpendicular to the longitudinal direction.

The force sensor 5 can be adapted to be positioned at a bearing support 20 of an intermediate casing of the turbomachine. In particular, the force sensor 5 can be arranged at the frusto-conical portion 22 of the bearing support 20.

Figure 6:
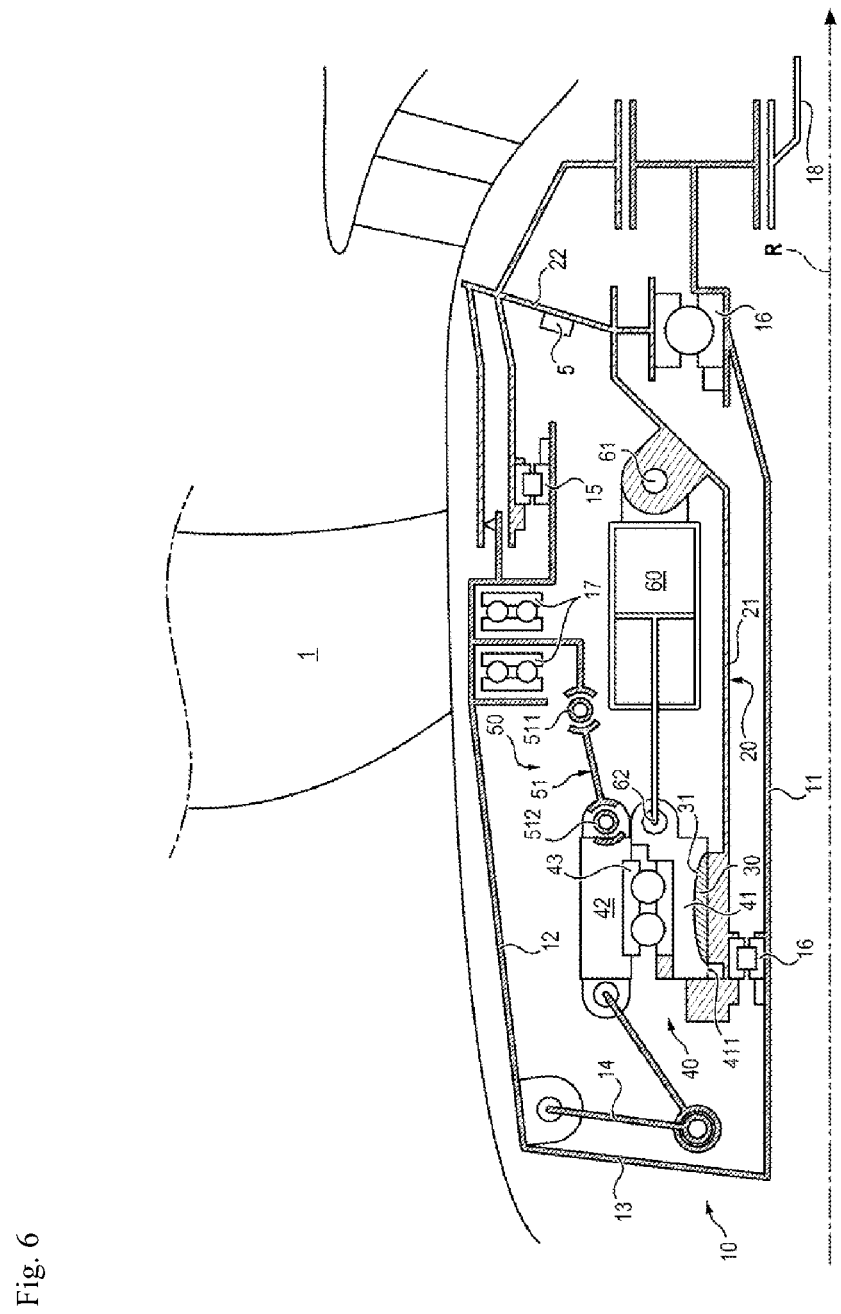
FIGS. 6 and 7 show schematic side views respectively for a first and a second azimuth of the engine of a system for controlling the cyclic pitch of blades conforming to one embodiment.
Figure 7:
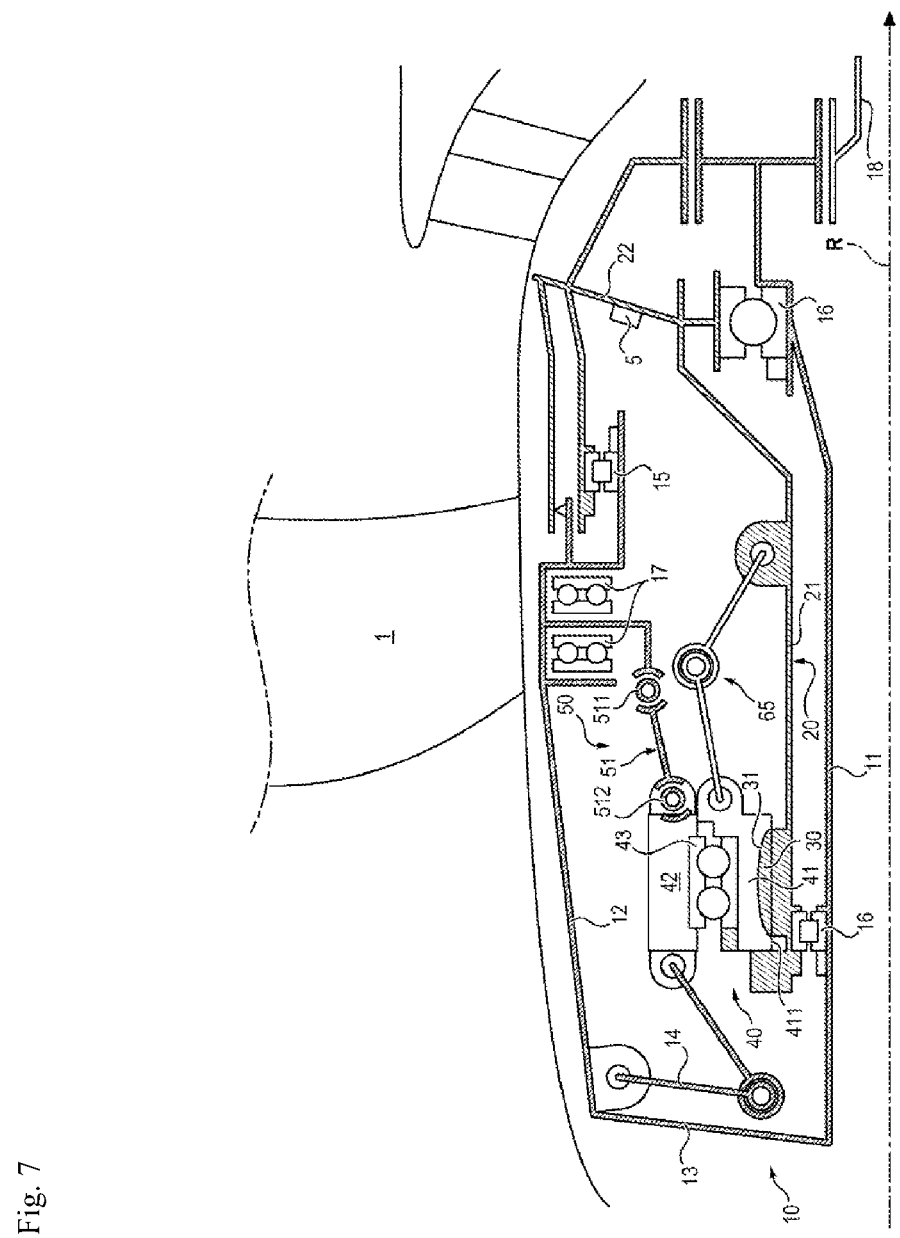

The forces exerted on the blades 1 of the propeller during their rotation are transmitted to the bearing support 20 via one or more antifriction bearing(s) 16 arranged between the rotor shaft 10 and the bearing support 20, for example between the inner portion 11 of the rotor shaft 10 and the bearing support 20. Thus, a force measured on the bearing support 20 is representative of a force exerted on the blades 1 of the propeller. The bearing(s) 16 transmit the bending to the intermediate casing, and this bending can be captured by the force sensor 5 and translated into a lateral load on the propeller. By way of a non-limiting example, FIGS. 6 and 7 illustrate two antifriction bearings 16, one being situated in proximity to the plate assembly 40, the other being situated in proximity to the frusto-conical portion 22 of the bearing support 20.

When the thrust is not directed solely in the longitudinal direction, the force generated on the blades 1, hence on the bearing support 20, is not homogenous over the entire circumference of the bearing support 20, which causes a deformation of the bearing support 20. The force sensor 5 measures the deformation of the bearing support 20, which is representative of the forces exerted on the blades 1 of the propeller. In particular, the deformation of the bearing support 20 can be a bending deformation directed in a direction corresponding to a direction, in the normal plane P, of the parasite forces exerted on the blades 1.

The force sensor 5 can be bonded to a face of the bearing support 20. As a variant, a hollow can be provided in the bearing support 20 and the force sensor 5 can be inlaid into this hollow. As a variant, the force sensor 5 can be welded to the bearing support 20, or fixed to the bearing support 20 by any means that can be contemplated.

The force sensor 5 can measure the deformation of the bearing support 20 in a measurement direction, the deformation being representative of the parasite force exerted on the blades 1 in the measurement direction.

The force sensor 5 can be calibrated in order to establish a function linking a force measured in the measurement direction and an electric measurement signal emitted by the force sensor 5. To carry out this calibration, the bearing support 20 is loaded in the measurement direction of the force sensor 5, for example via a cylinder 60 or of a mass. The force sensor 5 is powered to obtain the desired variation of voltage at the output of the sensor for a determined value of force in the measurement direction. The calibration can be repeated for several values of force in the measurement direction.

The calibration allows obtaining a force function linking the force in the measurement direction to the output voltage of the force sensor 5, i.e. to the measurement signal Sm. The force E exerted on the bearing support 20 can then be linked to the voltage V at the output of the force sensor 5 via the force function f by the following relation: $E=f(V)$.

The system for controlling the cyclic pitch of blades 1 can comprise one or more force sensors 5, arranged in one or more sets of force sensors 501, 502. A system comprising several force sensors 5 offers better measurement accuracy, reduction of possible inaccuracies, errors or measurement bias, as well as correction of parasite phenomena different from the phenomenon to be observed.

Each set of one or more force sensors 501, 502 can measure a deformation of the bearing support 20 in a measurement direction of the normal plane P relative to the axis of the propeller, the deformation being representative of the component of the parasite force exerted on the blades 1 in the measurement direction.

If the system comprises several sets of force sensors 501, 502 with different measurement directions, the calibration can be repeated for each measurement direction.

By way of an example, the system for controlling the cyclic pitch of blades 1 can comprise two sets of force sensors 501, 502, each comprising one or more force sensors 5. A first set of force sensors 501 is suitable for measuring a force in a first direction of the normal plane P, and a second set of forces sensors 502 is suitable for measuring a force in a second direction of the normal plane P.

The second direction can be perpendicular to the first direction. As a variant, the second direction can be a direction different from the first direction without being perpendicular to the first direction.

The system can also comprise a first cylinder 60 suitable for being actuated in response to a force measured by the first set of force sensors 501, and a second cylinder 60 suitable for being actuated in response to a force measured by the second set of force sensors 502.

Thus, regardless of the force exerted in the normal plane P on the axis of rotation r of the propeller, the two sets of force sensors 501, 502 measure the forces exerted on the bearing support 20 in the two measurement directions. These forces being representative of forces exerted in the normal plane P on the blades 1 of the propeller, an arrangement of the set of force sensors 501, 502 allows adapting the pitch of the blades 1 of the propeller via the two cylinders 60 in response to the forces measured in the normal plane P.

Figure 3A:
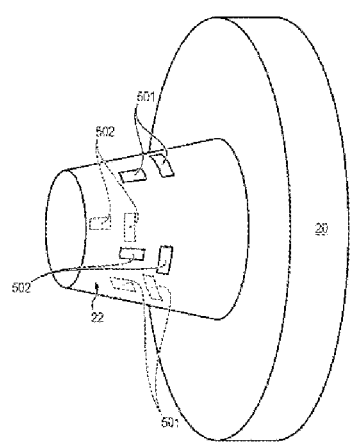
FIG. 3a shows a schematic perspective view of a bearing support of a system for controlling the cyclic pitch of blades according to one embodiment.

FIG. 3a illustrates an exemplary embodiment in which the system for pitching blades 1 comprises two sets of force sensors 501, 502. Each set of force sensors 501, 502 comprises four unidirectional variable resistance strain gauges arranged to form a Wheatstone bridge. The four strain gauges are arranged two by two on the bearing support 20 in two diametrically opposite pairs of strain gauges relative to the bearing support 20 in the direction of measurement. The four strain gauges 501 are arranged two by two at 6 o'clock and 12 o'clock and capture the vertical bending. The four gauges 502 are arranged two by two at 3 o'clock and 9 o'clock and capture the horizontal bending. Each pair comprises a first gauge arranged in the axial direction which captures bending, a set of two pairs allowing rejecting errors or bias in axial bending. Each pair comprises a second gauge arranged perpendicularly to the first gauge, which allows rejecting torsion and the expansion of the casing which is linked to the thermal effect. An arrangement of force sensors 5 of this type in a Wheatstone bridge allows eliminating measurement bias due for example to the environmental conditions in which the force sensors 5 are located, for example bias due to torsion and to temperature. The strain gauge bridges allow rejecting torques and/or axial forces measured on certain of the sensors 5 and not on others, to eliminate inaccuracies, errors or measurement bias, and to correct different parasite phenomena different from the phenomenon to be observed.

Figure 3B:
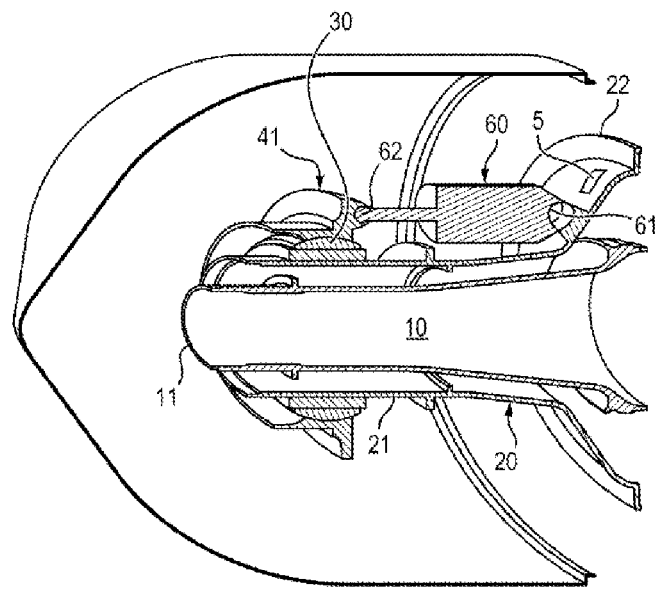
FIGS. 3b and 3c show schematic views, respectively partial perspective and front, of a system for controlling the cyclic pitch of blades according to one embodiment.
Figure 3C:
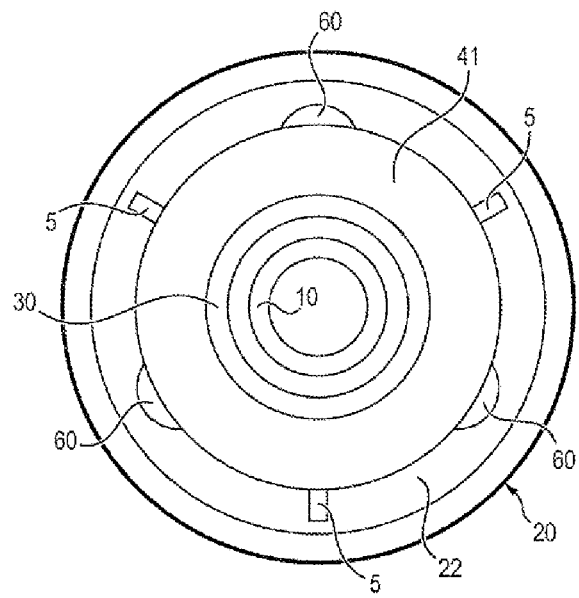

FIG. 3c illustrates an exemplary embodiment in which the system for pitching blades 1 comprises three sets of two force sensors 5, arranged at 120° from one another on the bearing support 20. Each set measures a force in the measurement direction, one set of force sensors 5 being useful both for determining the vertical force and the horizontal force. An arrangement of force sensors 5 of this type allows sharing their functions and therefore using a smaller number of force sensors 5.

The system can also comprise additional strain gauges in order to improve the rejection of parasite phenomena such as the exclusion of temperature measurement bias. In addition, the force sensor sets can be redundant, or even segregated, to improve the reliability of measurement.

Plate Assembly 40

The plate assembly 40, illustrated by way of a non-limiting example in FIGS. 6 and 7, can be inclined relative to the normal plane P on the axis of rotation r of the propeller. In other words, the plate assembly 40 can be displaced for form a nonzero angle with the plane formed by the blades 1 of the propeller. A modification of the inclination of the plate assembly 40 causes a modification of the pitch of the blades 1, via the articulation system 50.

The plate assembly 40 can be annular and have axial symmetry around the axis of rotation r. Thus, an inclination of the plate assembly 40 relative to the normal plane P causes an opposite displacement of identical amplitude of two diametrically opposite points of the plate assembly 40.

The plate assembly 40 can comprise an inner plate 41 and an outer plate 42. The inner plate 41 and the outer plate 42 are independent in rotation around the axis of rotation r of the propellers and are integral in inclination relative to the normal plane P.

The inner plate 41 and the outer plate 42 can be annular and centered around the axis of rotation r of the propeller. The outer plate 42 is located in a position that is more distant from the axis of rotation r of the propeller than the inner plate 41.

The inner plate 41 is mounted fixed in the stator frame of reference, i.e. it is not driven in rotation around the axis of rotation r of the propeller. The outer plate 42 is mounted movable in rotation around the axis of rotation r of the propeller, and is driven in rotation around the axis of rotation r of the propeller during the operation of the propeller, the outer plate 42 following the rotation of the blades 1.

The inner plate 41 and the outer plate 42 can be separated from one another via a bearing 43 so that the inner plate 41 and the outer plate 42 are independent in rotation around the axis of rotation r and are integral in inclination relative to the normal plane P. The bearing 43 can be placed between the inner plate 41 and the outer plate 42, in particular at the undercuts formed in each of the inner 41 and outer 42 annular plates. The bearing 43 is an antifriction bearing and can be a double ball bearing with opposite oblique contacts. Due to the antifriction bearing 43, when the outer plate 42 is driven in rotation around the axis of rotation r of the propeller during the operation of the propeller, the inner plate 41 is not driven in rotation around the axis of rotation r of the propeller and remains fixed in the stator frame of reference. On the other hand, an inclination of the inner plate 41 relative to the normal plane P drives a corresponding inclination of the outer plate 42 relative to the normal plane P.

The inner plate 41 can have a substantially cylindrical shape around the axis of rotation r when the plate assembly 40 is not inclined. Thus, for a zero inclination of the plate assembly 40, the travel of a cylinder 60 arranged in a substantially longitudinal direction between the frusto-conical portion 22 of the bearing support 20 and the inner plate 41 is substantially identical regardless of the position of the cylinder 60 around the axis of rotation r.

The outer plate 42 can have a substantially cylindrical shape around the axis of rotation r and a substantially circular outer perimeter around the axis of rotation r when the plate assembly 40 is not inclined. Thus, for a zero inclination of the plate assembly 40, a distance between the plate assembly 40 and a blade 1 is identical.

The bearing support 20 of the intermediate casing can be located between the inner portion 11 of the rotor shaft 10 and the inner plate 41 of the plate assembly 40.

The rotor shaft 10 can be articulated, for example at its outer portion 12, on the outer plate 42 via a rotating compass 14, and be articulated relative to the articulation system 50 at the junction with the blades 1 via one or more antifriction bearing(s) 17.

During the operation of the propeller, the bearing support 20 on which the force sensor 5 is mounted, as well as the inner plate 41, are not driven in rotation around the axis of rotation r of the propeller. On the other hand, the rotor shaft 10, the outer plate 42, the articulation system 50 and the blades 1 are driven in rotation around the axis of revolution r, these parts being integral in rotation.

The cylinder 60 can be actuated so as to modify the inclination of the inner plate 41, and the articulation system 50 can articulate the outer plate 42 relative to the blades 1. Thus, actuation of the cylinder 60 in response to a force measured by the force sensor 5 causes a modification of the inclination of the inner plate 41, which causes a corresponding modification of the inclination of the outer plate 42, the inner plate 41 and the outer plate 42 being integral in inclination, which causes a modification of the pitch of the blades 1.

The system can also comprise a ball 30. The ball 30 can be annular around the axis of rotation r and comprise an outer surface 31. The annular ball 30 can be arranged between the rotor shaft 10 and the plate assembly 40, more precisely between the bearing support 20 and the inner plate 41.

The plate assembly 40, in particular the inner plate 41, can comprise an inner surface 411 with a shape complementary to the outer surface 31 of the ball 30 and positioned in contact with the ball 30, so that the outer surface 31 of the ball 30 guides a displacement in inclination of the plate assembly 40.

The inner surface 411 of the inner plate 41 can have a shape complementary to the outer surface 31 of the ball 30 and be positioned in contact with the outer surface 31 of the ball 30.

The ball 30 can in particular have a domed outer surface 31. Thus, an actuation of the cylinder 60 causes a displacement in inclination of the plate assembly 40 by means of sliding of the plate assembly 40 in contact with the domes outer surface 31 of the ball 30. The more or less domed shape of the outer surface 31 of the ball 30 can cause a more or less great inclination of the plate assembly 40 for the same displacement of the cylinder 60, and therefore a more or less great modification of the pitch of the blades 1 for given displacement of the cylinder 60.

As a variant, the outer surface 31 of the ball 30 can have any suitable shape for guiding an inclination of the plate assembly 40 during its actuation by the cylinder 60.

FIG. 3b illustrates a partial 3D view of the inner portion 11 of the rotor shaft 10, of the bearing support 20, of the ball 30, of the inner plate 41 and of a cylinder 60, according to one exemplary embodiment. The antifriction bearing 43 between the inner plate 41 and the outer plate 42, as well as the system 50 for articulating the plate assembly 40 relative to the blades 1, is not shown.

Articulation System 50

The articulation system 50, illustrated by way of a non-limiting example in FIGS. 4a, 5a, 6 and 7, can comprise a set of connecting rods 51. Each connecting rod 51 can be articulated at a first end 511 on an associated blade 1 and at a second end 512 on the plate assembly 40. The connecting rods 51 can be mounted movable in rotation around the axis of rotation r of the propeller. The displacement of a connecting rod 51 can cause a rotation of the blade 1 capable of modifying its pitch. Thus, an inclination of the plate assembly 40 causes a corresponding displacement of the connecting rods 51 able to cyclically modify the pitch of the blades 1. In particular, each connecting rod 51 can be connected to a blade 1 by means of a pivoting link 513.

In other words, a connecting rod 51 can be displaced so as to cause the blade 1 to turn around a pivot whether the connecting rod 51 is pulled or pushed via the plate assembly 40. When the blade 1 turns around the pivot, its pitch, i.e. the angle formed between on the one hand an axis connecting the leading edge with the trailing edge of the blade 1, and on the other hand the axis of rotation r of the propeller is consequently modified.

Thus, an inclination of the plate assembly 40 conditions the movement of the connecting rods 51. When the plate assembly 40 is not inclined, the connecting rods 51 can be substantially arranged in the longitudinal direction. When the plate assembly 40 is inclined, each connecting rod 51 has a position different from that of another connecting rod 51 and is thus displaced cyclically during the rotation of the propeller, which consequently causes a cyclic modification of the pitch of the blades 1.

In particular, each connecting rod 51 can be connected at its second end 512 to the outer plate 42. Thus, an inclination of the plate assembly 40, hence of the outer plate 42, causes a cyclic displacement of the second end 512 of the connecting rods 51, hence of the first end 511 of the connecting rods 51, the cyclic displacement of the first end 511 of the connecting rods 51 being able to cyclically modify the pitch of the blades 1.

More precisely, the connecting rods 51 can be distributed on the substantially circular outer perimeter of the outer plate 42, the arrangement of the connecting rods 51 corresponding to the arrangement of the blades 1. Thus, the first ends of the connecting rods 51 are arranged substantially in a circle in a plane P normal to the axis of rotation r of the propeller when the plate assembly 40 is not inclined.

An inclination of the outer plate 42 relative to the normal plane P causes a corresponding inclination of the substantially circular outer perimeter of the outer plate 42, hence of the circle formed by the first ends 511 of the connecting rods 51, which causes an opposite displacement of identical amplitude of the first ends 511 of two diametrically opposite connecting rods 51 on the outer perimeter of the outer plate 42. Thus, the two blades 1 associated with the two diametrically opposite connecting rods 51 undergo an opposite modification with identical amplitude of their pitch. The blades 1 of this system therefore have a cyclic and continuously variable pitch during a rotation of the blade 1.

Cylinder 60

The system comprises a cylinder 60 suitable for inclining the plate assembly 40, the cylinder 60 being actuated in response to a force measured by the force sensor 5.

The cylinder 60 is illustrated by way of a non-limiting example in FIGS. 3b, 3c, and 6 to 9.

The actuation of the cylinder 60 can be able to modify the inclination of the plate assembly 40, hence the pitch of the blades 1.

The cylinder 60 can comprise a rod able to be retracted or extended via a cylinder actuator 60, the travel of the cylinder 60 being consequently modified.

The cylinder 60 can be arranged substantially in the longitudinal direction r. The cylinder 60 can have a first end 61 connected to the bearing support 20 and a second end 62 connected to the plate assembly 40. In particular, the second end 62 of the cylinder 60 can be mounted on the inner plate 41 at an outer perimeter of the inner plate 41, and the first end 61 of the cylinder 60 can be mounted on the frustoconical 22 of the bearing support 20 at a position in the normal plane P substantially identical to the position in the normal plane P of the second end 62 of the cylinder 60. Thus, the cylinder 60 is arranged in a substantially longitudinal direction between the bearing support 20 and the inner plate 41.

The cylinder 60 is actuated in translation along the longitudinal axis r. The displacement of the cylinder 60 in translation in the longitudinal direction causes a corresponding displacement of the portion of the plate assembly 40 on which is mounted the cylinder 60. This displacement causes an inclination of the plate assembly 40 in a direction perpendicular to the longitudinal axis r, the inclination of the plate assembly 40 being guided, if necessary, by the ball 30.

Thus, the displacement of the cylinder 60 causes a modification of the inclination of the inner plate 41, hence of the outer plate 42, which causes a displacement of the blade 1 pitch connecting rod 51 able to modify the pitch of the blade 1.

The system for controlling the cyclic pitch of blades 1 can comprise several cylinders 60 suitable to be displaced by one or more actuators.

By way of an example, the system of pitching blades 1 can comprise two cylinders 60 arranged around the outer perimeter of the inner plate 41, the two cylinders being spaced with an angular separation of 90° relative to one another. This configuration is illustrated by way of an example in FIG. 9. The actuation of the first cylinder 60 then allows inclining the inner plate 41 in a first direction, and the actuation of the second cylinder 60 allows inclining the inner plate 41 in a second direction, the second direction being perpendicular to the first direction.

The actuation of the first cylinder 60, i.e. the retraction or the extension of the rod of the first cylinder 60, can be accomplished independently of the actuation of the second cylinder 60. Thus, the inclination of the plate assembly 40 in a first and a second direction can be controlled independently, and any combination of inclination of the plate assembly 40 in the first and the second direction can be contemplated.

The system can also comprise an anti-rotation connecting rod 65, illustrated by way of a non-limiting example in FIG. 7. The anti-rotation connecting rod 65 can have a first end mounted on the bearing support 20, in particular at the substantially cylindrical portion 21 of the bearing support 20, and a second end 62 mounted on the plate assembly 40, in particular on the inner plate 41. The anti-rotation connecting rod 65 prevents the inner ring of the bearing 43 from turning, and thus prevents the cylinders 60 from twisting.

Control Law

Figure 10:
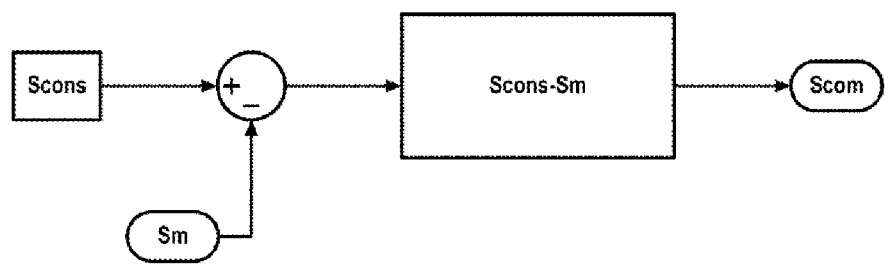
FIG. 10 shows a diagram illustrating the generation of a control signal of a system for controlling the cyclic pitch of blades conforming to one embodiment.

The actuation of the cylinder 60 is controlled in response to a force measured by the force sensor 5, the actuation of the cylinder 60 causing a cyclic modification of the pitch of the blades 1 via the inclination of the plate assembly 40. A schematic illustrating an example of the control law for actuating the cylinder 60 is shown in FIG. 10.

To this end, the system for controlling the cyclic pitch of blades 1 can comprise a control unit 70 suitable for generating a blade 1 pitch control signal Scom based on a comparison between the measurement signal Sm originating in the force sensor 5 and a predetermined set point signal Scons, the cylinder 60 being suitable for being displaced in response to the control signal Scom.

The measurement signal Sm originating in the force sensor 5 can correspond, for example in the case where the force sensor 5 is a strain gauge, to an output voltage of the force sensor 5, the measurement signal Sm depending on the force exerted on the force sensor 5 in the measurement direction.

The set point signal Scons has a predetermined value, which corresponds to an output measurement signal Sm of the force sensor 5 obtained when a force measured by the force sensor 5 in the measurement direction corresponds to a predetermined force in the measurement direction.

The comparison between the measurement signal Sm and the set point signal Scon can be accomplished in real time by the control unit 70 during the flight. Thus, the cyclic control of the pitch of the blades 1 is accomplished in a closed loop, i.e. the system takes into account the influence of the movement of the cylinder 60 on the output measurement signal Sm of the force sensor 5 to control the displacement of the cylinder 60.

When the measurement signal Sm corresponds to the set point signal Scons, the control unit 70 can generate a control signal Scom which corresponds to an unchanged position of the cylinder 60, hence to an unchanged pitch of the blades 1.

On the other hand, when the measurement signal Sm is different from the set point signal Scons, the control unit 70 can generate a control signal Scom which corresponds to a modification of the position of the cylinder 60 so as to modify the pitch of the blades 1 so that the output measurement signal Sm of the force sensor 5 approaches the target set point signal Scons.

The value of the control signal Scom can vary depending on the value of the difference between the measurement signal Sm and the set point signal Scons, so that the amplitude of the modification of the pitch of the blades 1 is adapted to the difference between the measurement signal Sm and the set point signal Scons.

One control loop, illustrated by way of an example in FIG. 10, can be implemented per set of force sensors 5. For example, for a system with two sets of force sensors 5, the control unit 70 can control two control loops. For each loop, the control unit 70 generates a control signal Scom for pitching the blades 1 based on a comparison between a measurement signal Sm originating in the force sensor 5 associated with said loop, and a predetermined set point signal Scons associated with said loop.

In a first embodiment, the cylinder 60 is located in the same plane as the force sensor 5. The system comprises two sets of force sensors 5, measuring respectively a horizontal force and a vertical force, and two cylinders 60, suitable respectively so that their actuation causes a displacement of the plate assembly 40 relative to the horizontal and to the vertical. The system comprises two control loops, each associated with a cylinder 60. The control signal Scom generated for each loop controls the actuation of the associated cylinder 60.

In a second embodiment, the cylinder 60 is located in a plane different from the plane of the force sensor 5. The system can comprise two sets of force sensors 5, as illustrated by way of an example in FIG. 3a, and three cylinders 60 distributed regularly over the perimeter of the inner plate 41, as illustrated by way of an example in FIG. 8. In this case, the control unit 70 must carry out a calculation for controlling the cylinders 60.

When the system comprises three cylinders 60, the cyclic pitch of the blades 1 is modified by a displacement of one or more of the three cylinders 60 in response to the forces in the normal plane P measured by the force sensor(s) 5. The control unit 70 generates a control signal Scom suitable for actuating each of the cylinders 60 independently of one another, so as to incline the plate assembly 40 relative to the normal plane P.

The plate assembly 40 can be inclined equivalently whether the system includes two or three cylinders 60. In fact, the measured forces can be inscribed in the configuration with three cylinders 60 positioned respectively at F1, F2 and F3, or in the configuration with two cylinders 60 positioned respectively at Ftp and F3p. Thus, the travel of the three cylinders 60 can be modified to control the cyclic pitch of blades 1 in a manner equivalent to the modification of the cyclic pitch of the blades 1 in a system with two cylinders 60.

The control unit 70 can be suitable for generating a control signal Scom adapted to actuate the cylinder 60, hence modifying the pitch of the blades 1, when the measurement signal Sm differs from the set point signal Scons by a predetermined difference for a predetermined period.

As a variant, only a criterion of predetermined difference between the measurement signal Sm and the set point signal Scons is taken into account to generate a control signal Scom suitable for actuating the cylinder 60 and therefore modifying the pitch of the blades 1.

The predetermined difference can be selected so as to retain a force on the blades 1 which is close to the desired set point force. In other words, the control unit 70 can generate a control signal Scom corresponding to an actuation of the cylinder 60, hence to a modification of the pitch of the blades 1, when the force in the normal plane P measured by the force sensor 5 exceeds a predetermined force for a predetermined period.

The predetermined force can be selected so as to optimize an operation of the propeller, minimize loads on the engine suspension and the blades 1 in order to reduce the mass of the propeller and increase the lifetime of the propeller.

According to one embodiment, the actuation of the cylinder 60 is controlled so as to cancel parasite forces exerted on the blades 1 in a plane P normal to the axis of rotation r of the blades 1. In this case, the set point signal Scons corresponds to a cancellation of the forces exerted in the normal plane P. In other words, the set point signal Scons corresponds to a measurement signal Sm of the force sensor 5 representative of a force measured by the force sensor 5 which is zero in the measurement direction. The set point signal Scons can be equal to 0.

When the set point signal Sc corresponds to a cancellation of a force in the normal plane P, the pitch of the blades 1 is modified when a change of direction of the thrust relative to a longitudinal thrust is detected.

The predetermined period can be selected so as to ensure a stability of response of the system without excess reactivity. For example, the predetermined duration can be comprised between 0.1 seconds and 10 seconds, preferably between 0.5 seconds and 3 seconds, preferably approximately one second. Thus, when the force sensor 5 measures a non-longitudinal force for a period greater than one second, the control unit 70 generates a control signal Scom tending to displace the cylinder 60 so as to cancel the parasite non-longitudinal forces, hence achieve a zero measurement signal Sm of output voltage from the force sensor 5.

Thus, the system allows controlling the cyclic pitch of the blades in order to align the thrust vector of the propeller with the longitudinal axis r, which has the effect of reducing, or even cancelling, the 1P moments exerted on the blades 1. Thus the mass of the propeller can be reduced and the lifetime of the propeller increased. Moreover, the system reacts to changes in the airplane's attitude, while avoiding measurement biases, the system not reacting to more rapid phenomena such as wind gusts.

As a variant, the measurement signal Sm can be averaged over a given period in order not to take into account the value of the measurement signal Sm at an instant t, but rather the value of the measurement signal Sm averaged over the given period. Thus the system does not react to rapid phenomena.

The control unit 70 can comprise a corrector of the PID (Proportional, Integral, Derivative) type.

The system can comprise two cylinders 60 which can be actuated independently of one another in translation along the longitudinal direction, the two cylinders 60 being spaced with an angular separation of 90°. The system can also comprise two sets of force sensors 5 measuring the forces exerted in a first measurement direction and a second measurement direction, the first and second measurement directions being perpendicular and located in the normal plane P. A force exerted in the normal plane P comprises a first force component in the first measurement direction, this first force component being measured by the first force sensor 5 and a second force component in the second measurement direction, this second force component being measured by the second force sensor 5.

The first cylinder 60 is arranged so that its actuation causes an inclination of the plate assembly 40 in the first direction, and the second cylinder 60 is arranged so that its actuation causes an inclination of the plate assembly 40 in the second direction.

When a nonzero force is measured by the first force sensor 5, i.e. when the first force component is nonzero, the control unit 70 generates a control signal Scom determined so as to reduce the first force component by modifying the travel of the first cylinder 60 in order to incline the plate assembly 40 in the first direction. The pitch of the blades 1 is thus modified in response to a nonzero force measured by the first force sensor 5. Likewise, when a nonzero force is measured by the second force sensor 5, the control unit 70 generates a control signal Scom determined so as to displace the second cylinder 60 to modify the pitch of the blades 1 so as to reduce the second force component.

A force sensor 5 can be associated with a cylinder 60, so that the displacement of the cylinder 60 in the longitudinal direction inclines the inner plate 41 in the measurement direction of the force sensor 5. As a variant, the number of cylinders 60 and of force sensors 5 can be different, and/or the measurement direction can be offset relative to the direction of inclination of the plate assembly 40 by a cylinder 60. In this case, the component of a force exerted in a measurement direction is projected into an inclination direction of the plate assembly 40. The measurement signal Sm, compared to the set point measurement signal Scon, corresponds to the sum of the projections in the direction of inclination of the plate assembly 40 of the measurement signals of the force sensors 5.

Figure 9:
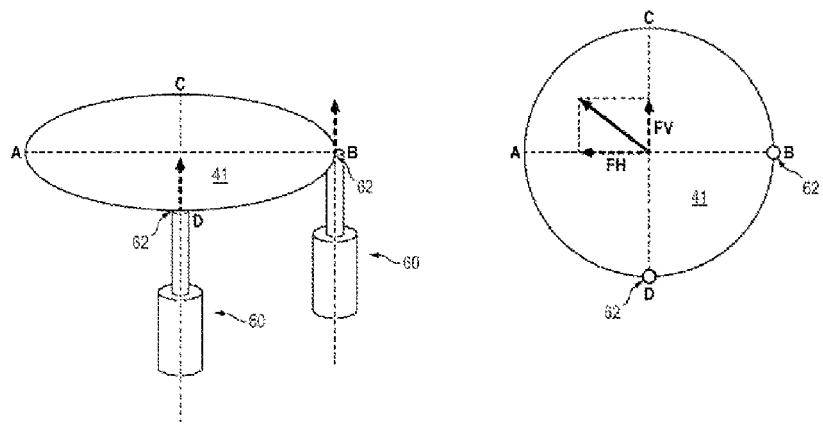
FIG. 9 shows a schematic illustrating cylinders and a plate of a system for controlling the cyclic pitch of blades conforming to one embodiment.

By way of an example, in the illustration of FIG. 9, a first cylinder 60 allows inclining the plate in rotation along the axis AB, and thus acting on the force FV, and a second cylinder 60 allows inclining the plate in rotation along the axis CD, and thus acting on the force FH.

Thus, when a force in the direction AB is measured, the position of the second cylinder 60 is modified so as to incline the plate assembly 40 in the direction CD, which tends to reduce the angle of attack of the blades 1 at point A, causing a smaller thrust force on the blade 1 on the side of point A, which causes a reduction of the force in the direction AB. Likewise, when a force in the direction CD is measured, the first cylinder is then displaced so as to incline the plate assembly 40 in the direction AB so as to reduce the force in the direction CD.

Collective Pitch System

The system for controlling the cyclic pitch of blades 1 can also comprise a system for controlling the collective pitch of blades 1 configured to simultaneously and identically modify the pitch of all the blades 1 of the propeller.

Figure 4A:
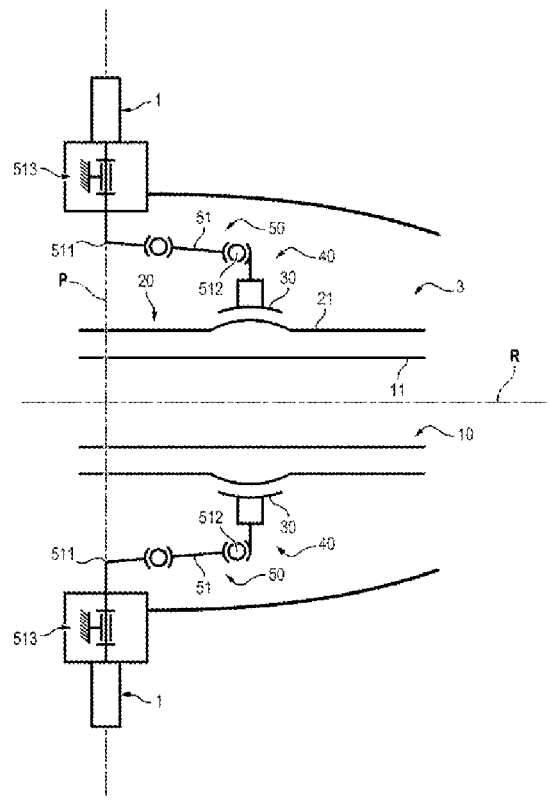
FIGS. 4a and 4b show schematic views, respectively from the side and from the front, of a system for controlling the cyclic pitch of blades conforming to one embodiment, the plate assembly not being inclined.
Figure 4B:
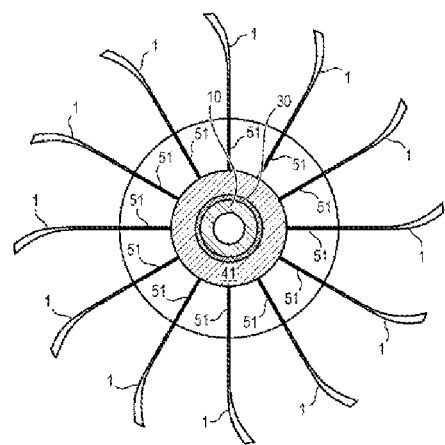

The system for controlling the collective pitch of blades 1 can be configured to displace the plate assembly 40 in translation in the longitudinal direction while retaining the same inclination of the plate assembly 40, so as to identically modify the pitch of each of the blades 1. FIG. 4b illustrates an example of a configuration in which the pitch of all the blades is identical.

In particular, the system for controlling the collective pitch of blades 1 can be configured to identically displace each of the connecting rods 51 so as to identically modify the pitch of each of the blades 1.

The collective pitch of the blades 1 and the cyclic pitch of the blades 1 can be controlled independently of one another. The collective pitch of the blades 1 is independent of the cyclic pitch of the blades 1 and does not depend on the cyclic pitch. The cyclic pitch of the blades 1 can depend on the collective pitch if this modifies the forces exerted on the blades 1.

The system for controlling the collective pitch of the blades 1 can comprise an actuator suitable for actuating a cylinder 60. The cylinder 60 can correspond to a cylinder 60 used for modifying the cyclic pitch of the blades 1 or to an additional cylinder 60 dedicated to the collective pitch of the blades 1. For a system comprising several cylinders 60, the travel of all the cylinders 60 is modified simultaneously and with the same value so as to displace in translation the plate assembly 40, and if applicable the ball 30, along the longitudinal axis r. Thus the pitch of all the blades 1 is modified simultaneously and with an identical value, so that the blades 1 are all subjected to an identical pitch. But the inclination of the plate assembly 40 is not modified, so that the blades 1 are not subjected to a cyclic pitch.

By way of an example, the system for controlling the pitch of the blades 1 can comprise three cylinders 60 distributed regularly over the perimeter of the inner plate 41, the three cylinders 60 being spaced by an angular separation of 120° relative to one another. The system with three cylinders 60 can allow both an inclination of the plate assembly 40 relative to the plane P in any inclination direction normal to the axis of rotation of the propeller r of the propeller, and a translation of the plate assembly 40 along the longitudinal direction.

The collective pitch of the blades 1 is modified by an identical displacement in translation, i.e. an identical modification of the travel of each of the three cylinders 60. This causes a displacement in translation along the longitudinal axis r relative to the bearing support 20 of the plate assembly 40 without modification of its inclination, which leads to an identical displacement of all the connecting rods 51 connected at a first end 511 to a blade 1 and at a second end 512 to the plate assembly 40, and hence an identical of the pitch of the blades 1 for all the blades 1.

The cyclic pitch of the blades 1 is modified by a different modification of the travel of one or more of the three cylinders 60, which causes an inclination of the plate assembly 40 relative to the normal plane P.

Figure 8:
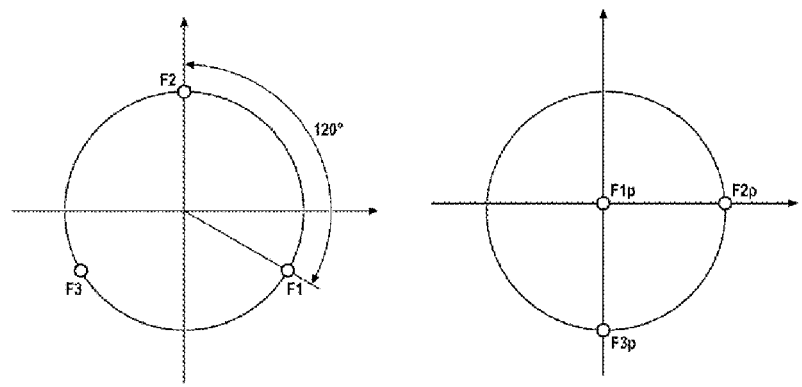
FIG. 8 shows a schematic illustrating the expression of a force in the normal plane, for systems for controlling the cyclic pitch of blades comprising two or three cylinders, and conforming to one embodiment.

As illustrated by way of an example in FIG. 8, a system with three cylinders is equivalent to a system with two cylinders also including a third cylinder dedicated to collective pitch. Indeed, the forces measured in the normal plane which are compensated by three cylinders 60 positioned at F1, F2 and F3, can be inscribed in the configuration with two cylinders 60, positioned at Ftp and F3p, the third component being applied to the center of the plate assembly 40 at F1 p, so as to modify only the collective pitch of the blades 1.

Other embodiments can be contemplated, and a person skilled in the art can easily modify the embodiments or exemplary embodiments disclosed above or contemplate others while remaining within the scope of the invention.

The invention claimed is:

1. A system for controlling a cyclic pitch of blades of a propeller of a turbomachine, the propeller comprising a set of blades movable in rotation around an axis of rotation relative to a stator frame of reference of the turbomachine, the blades being arranged in a plane normal to the axis of rotation of the propeller, called normal plane, wherein the system comprises:
   a plate assembly that can be inclined relative to the normal plane (P),
   an articulation system articulating the plate assembly relative to the blades so that an inclination of the plate assembly causes a cyclic modification of the pitch of the blades,
   a force sensor, mounted fixed in the stator frame of reference, the force sensor being suitable for measuring a force exerted in the normal plane by an air flow at an inlet of the propeller blades, and
   a cylinder suitable for inclining the plate assembly, the cylinder being suitable to be actuated in response to a force measured by the force sensor, wherein the plate assembly comprises an inner plate mounted fixed in the stator frame of reference and an outer plate mounted movable in rotation around the axis of rotation of the propeller, the inner plate and the outer plate being separated from one another by an antifriction bearing so that the inner plate and the outer plate are independent in rotation around the axis of rotation and are integral in inclination relative to the normal plane, wherein the cylinder is actuated so as to modify an inclination of the inner plate, and wherein the articulation system articulates the outer plate relative to the blades.

2. The system for controlling cyclic pitch of blades according to claim 1, wherein the force sensor comprises a strain gauge and is suitable for being positioned at a bearing support of an intermediate casing of the turbomachine.

3. The system for controlling cyclic pitch of blades according to claim 1, comprising a first set of force sensors suitable for measuring a force in a first direction of the normal plane and a second set of force sensors suitable for measuring a force in a second direction of the normal plane, the second direction being perpendicular to the first direction, the system further comprising a first cylinder suitable for being actuated in response to a force measured by the first set of force sensors, and a second cylinder suitable for being actuated in response to a force measured by the second set of force sensors.

4. The system for controlling cyclic pitch of blades according to claim 1, further comprising a ball comprising a domed outer surface, wherein the plate assembly comprises an inner surface with a shape complementary to the outer surface of the ball and positioned in contact with the outer surface of the ball, so that the outer surface of the ball guides a displacement in inclination of the plate assembly.

5. The system for controlling the cyclic pitch of blades according to claim 1, wherein the articulation system includes a set of connecting rods, each connecting rod being articulated at a first end on an associated blade by means of a pivoting link, and at a second end on the plate assembly, the connecting rods being mounted movable in rotation around the axis of rotation of the propeller, so that an inclination of the plate assembly causes a corresponding displacement of the connecting rods capable of cyclically modifying the pitch of the blades.

6. The system for controlling the cyclic pitch of blades according to claim 1, further comprising a control unit suitable for generating a blade pitch control signal based on a comparison between a measurement signal originating in the force sensor and a predetermined set point signal, the control signal being suitable for actuating the cylinder when the measurement signal differs from the set point signal by a predetermined difference for a predetermined period.

7. The system for controlling the cyclic pitch of blades according to claim 1, further comprising a system for controlling the collective pitch of blades configured to displace the plate assembly in translation in a longitudinal direction while retaining a same inclination of the plate assembly, so as to modify the pitch of each of the blades identically, the collective pitch of the blades being independent of a cyclic pitch of the blades.

8. A turbomachine comprising the system for controlling the cyclic pitch of blades of a propeller according to claim 1.

9. An aircraft comprising the system for controlling cyclic pitch of blades of a propeller according to claim 1.

* * * * *